UNITED STATES PATENT OFFICE.

CLARA H. BEHNAMAN, OF BEAVER FALLS, PENNSYLVANIA.

COMPOSITION OF MATTER FOR CLEANING TEXTILE FABRICS, LEATHER, &c.

1,234,266. Specification of Letters Patent. Patented July 24, 1917.

No Drawing. Application filed April 12, 1915. Serial No. 20,684.

*To all whom it may concern:*

Be it known that I, CLARA H. BEHNAMAN, a citizen of the United States, residing at Beaver Falls, in the county of Beaver and State of Pennsylvania, have invented a new and useful Improvement in Composition of Matter for Cleaning Textile Fabrics, Leather, &c., of which the following is a full, clear, and exact description.

My invention has relation to a composition matter to be used for cleaning textile fabrics of all kinds, such as clothing, laces, rugs, etc. Also leather articles.

In the manufacture of my improved cleaning composition, I prepare a solution containing ammonia, ether, chloroform, common table salt, baking soda and alum. In making this solution, I preferably use about 14 ounces of ammonia, 1 ounce of ether, 1 ounce of chloroform, and one tablespoonful each of table salt, baking soda and alum.

For each half pint of composition, I dissolve in about one half pint of hot water, three or four ounces of soap, preferably white naphtha soap, and to this I add one tablespoonful of the solution above described.

When the mixture cools, it hardens to a more or less solid condition. In using, it is dissolved in water and applied to the fabric to be cleaned with a brush, sponge or in any suitable manner.

The composition is exceedingly effective for cleaning purposes and can be used without danger or injury to the nature of the fabric.

While I prefer to use the proportions above described, these may be considerably varied without materially affecting the composition, and the claims are to be read with this in view.

I claim:

1. The herein described composition of matter for the purposes described, comprising a solution of ammonia, ether, chloroform, baking soda and alum in the proportions of about fourteen ounces of ammonia, one ounce of each of ether and chloroform, and one tablespoonful each of salt, baking soda and alum, said ingredients being mixed with a soap solution, substantially as described.

2. The herein described composition of matter for the purposes described, comprising a solution of ammonia, ether, chloroform, baking soda and alum in the proportions of about fourteen ounces of ammonia, one ounce of each of ether and chloroform, and one tablespoonful each of salt, baking soda and alum, said ingredients being mixed with a soap solution, in the proportion of about one tablespoonful of the first named solution to a half a pint of the soap solution, substantially as described.

In testimony whereof I have hereunto set my hand.

CLARA H. BEHNAMAN.

Witnesses:
H. M. CORWIN,
C. W. KOCH.